United States Patent [19]
Girgis

[11] Patent Number: 6,051,315
[45] Date of Patent: Apr. 18, 2000

[54] OPTICAL FIBER CABLE ASSEMBLY AND METHOD OF REDUCING WATER WICKING IN THE SAME

[75] Inventor: Mikhail M. Girgis, Wexford, Pa.

[73] Assignee: PPG Industries Ohio, Inc., Cleveland, Ohio

[21] Appl. No.: 09/018,749

[22] Filed: Feb. 4, 1998

Related U.S. Application Data

[63] Continuation of application No. 08/522,782, Sep. 1, 1995, Pat. No. 6,004,676, which is a continuation-in-part of application No. 08/081,045, Jun. 22, 1993, abandoned, which is a continuation-in-part of application No. 07/900,034, Jun. 17, 1992, abandoned.

[51] Int. Cl.[7] ........................................................ D02G 3/00
[52] U.S. Cl. .......................... 428/377; 428/380; 428/378; 428/36.3
[58] Field of Search .................................... 428/195, 378, 428/34.1, 36.3, 377, 380; 427/389.9, 393.4, 175, 389; 523/222, 523, 527; 524/591, 555, 507, 457, 494, 495, 501; 525/170, 176, 194, 278; 264/1.6, 1.24, 1.28

[56] References Cited

U.S. PATENT DOCUMENTS

| 3,175,988 | 3/1965 | Berns ...................................... 260/29.6 |
| 3,599,418 | 8/1971 | Hill ............................................ 57/164 |
| 3,617,353 | 11/1971 | Cooney ................................. 117/76 T |

(List continued on next page.)

FOREIGN PATENT DOCUMENTS

| 0 356 655 | 3/1990 | European Pat. Off. . |
| 2340389 | 10/1977 | France . |
| 51-043119 | 11/1976 | Japan . |
| 65-029948 | 8/1980 | Japan . |
| 62-236831 | 10/1987 | Japan . |
| 63-265839 | 11/1988 | Japan . |
| 92028663 | 5/1992 | Japan . |
| 93004349 | 1/1993 | Japan . |
| 595351 | 3/1978 | U.S.S.R. . |
| WO 94/15884 | 7/1994 | WIPO . |

OTHER PUBLICATIONS

Textile Chemicals Product Brochure entitled "Polymers, Resins and Monomers" for RHOPLEX® HA–8, HA–12, HA–16, from Rohm and Haas Company, Philadephia, Pennsylvania.
The Manufacturing Technology of Continuous Glass Fibres by K. L. Loewenstein (1973) pp. 29, 33–45.
"Building Better Nonwovens", Product Bulletin of Rohm and Haas Co. Specialty Industrial Polymers, 1994.
"Rhoplex Acrylic Emulsions for Bonding and Finishing Dry–Laid Nonwoven Fabrics", Technical Bulletin of Rohm and Haas Co.
"Rovene 5550", Technical Bulletin of Rohm and Haas Co. Specialty Polymers, Feb. 1994.
K. Loewenstein, *The Manufacturing Technology of Continuous Glass Fibres*, (2d Ed. 1983) at pp. 169–177, 224–230, 243–295.
"Chemicals for the Textile Industry", Technical Bulletin of Rohm and Haas Co., Nov. 1977.

(List continued on next page.)

*Primary Examiner*—Merrick Dixon
*Attorney, Agent, or Firm*—Ann Marie Cannoni; Andrew C. Siminerio

[57] ABSTRACT

The present invention provides an optical fiber cable assembly including an optical fiber and a reinforcement strand including a plurality of sized glass fibers positioned about the optical fiber, the strand having thereon a dried residue of a secondary aqueous coating composition which is essentially free of a urethane-containing material and includes a first polymer prepared by vinyl addition polymerization of a first monomer component including a first vinyl aromatic monomer and an acrylic monomer and a second polymer different from the first polymer, the second polymer being prepared by vinyl addition polymerization of a second monomer component including a curable polymer of a second vinyl aromatic monomer, wherein the surface of the strand wicks water at a rate of less than about 25.4 millimeters (one inch) in about six hours at a temperature of about 25° C. A method of reducing the wicking of water along the surface of a glass fiber strand is also provided.

17 Claims, 1 Drawing Sheet

U.S. PATENT DOCUMENTS

| | | | |
|---|---|---|---|
| 3,853,605 | 12/1974 | Fahey | 117/126 GB |
| 3,862,074 | 1/1975 | Hickey | 260/29.6 NR |
| 4,009,317 | 2/1977 | Chase et al. | 428/378 |
| 4,029,623 | 6/1977 | Maaghul | 260/29.6 RW |
| 4,038,243 | 7/1977 | Maaghul | 260/40 R |
| 4,049,865 | 9/1977 | Maaghul | 428/391 |
| 4,060,658 | 11/1977 | Lin et al. | 428/378 |
| 4,066,591 | 1/1978 | Scriven et al. | 260/29.2 TN |
| 4,107,120 | 8/1978 | Plamondon et al. | 260/29.6 RB |
| 4,137,209 | 1/1979 | Wong et al. | 260/29.6 NR |
| 4,143,091 | 3/1979 | Chang et al. | 260/859 R |
| 4,147,555 | 4/1979 | Cohen et al. | 106/99 |
| 4,164,485 | 8/1979 | Girgis | 260/5 |
| 4,181,769 | 1/1980 | Plamondon et al. | 428/253 |
| 4,188,421 | 2/1980 | Matsuura et al. | 427/385 A |
| 4,208,494 | 6/1980 | Chang et al. | 525/440 |
| 4,208,495 | 6/1980 | Chang et al. | 525/440 |
| 4,239,800 | 12/1980 | Girgis | 428/374 |
| 4,263,362 | 4/1981 | Straka | 428/258 |
| 4,291,095 | 9/1981 | Chase et al. | 428/391 |
| 4,316,929 | 2/1982 | McIntire et al. | 428/262 |
| 4,374,177 | 2/1983 | Hsu et al. | 428/392 |
| 4,382,991 | 5/1983 | Pollman | 428/391 |
| 4,390,647 | 6/1983 | Girgis . | |
| 4,454,285 | 6/1984 | Bijen | 524/5 |
| 4,473,616 | 9/1984 | Rademacher | 428/251 |
| 4,576,987 | 3/1986 | Crockatt et al. | 524/487 |
| 4,657,804 | 4/1987 | Mays et al. | 428/212 |
| 4,663,231 | 5/1987 | Girgis et al. | 428/378 |
| 4,728,573 | 3/1988 | Temple | 428/378 |
| 4,762,750 | 8/1988 | Girgis et al. | 428/378 |
| 4,762,751 | 8/1988 | Girgis et al. | 428/378 |
| 4,795,678 | 1/1989 | Girgis | 428/391 |
| 4,948,829 | 8/1990 | Mitsuji et al. . | |
| 4,954,559 | 9/1990 | Den Hartog et al. | 524/507 |
| 5,171,634 | 12/1992 | Soszka et al. | 428/376 |
| 5,182,784 | 1/1993 | Hager et al. | 385/128 |
| 5,197,202 | 3/1993 | Jensen . | |
| 5,319,003 | 6/1994 | Gomez et al. . | |
| 5,385,756 | 1/1995 | Lofton | 427/389.9 |

OTHER PUBLICATIONS

"Glass Reinforcements in Composite Telecommunication Cable", T. Hager, 50th Annual Conference, Composites Institute, The Society of Plastics Industry, Inc., Jan. 30–Feb. 1, 1995.

Hawley's Condensed Chemical Dictionary (12th Ed. 1993) at pp. 331, 435, 461, 1075.

Kirk–Othmer Encyclopedia of Chemical Technology, vol. 1 (1963) at pp. 203–205, 259–297, 305–307; vol. 19 at pp. 90–95; vol. 21 at pp. 56–69.

PN–3716–L1 Technical Data Sheet of H. B. Fuller Co. (Jul. 25, 1994).

PN–3716–K Technical Data Sheet of H. B. Fuller Co. (Jul. 25, 1994).

*Encyclopedia of Polymer Science and Technology*, vol. 13 (1970) at pp. 130–134, 156–197.

ASTM D1871–68 "Standard Test Methods for Rubber Property—Adhesion to Single–Strand Wire" (1975).

"Kevlar™ Aramid Non–Wicking Yarns", Product Bulletin of E. I. du Pont de Nemours.

"Raw Material Specification for Wire and Cable Products", Natural Code No. 38–09–XX, p. 8. Bulletin of Superior Cable Corporation.

OPTICAL FIBER CABLE ASSEMBLY AND METHOD OF REDUCING WATER WICKING IN THE SAME

CROSS REFERENCE TO RELATED APPLICATIONS

This is a continuation of U.S. patent application Ser. No. 08/522,782, now U.S. Pat. No. 6,004,676 which is a continuation-in-part of U.S. patent application Ser. No. 08/081,045, filed Jun. 22, 1993, abandoned, which is a continuation-in-part of U.S. patent application Ser. No. 07/900,034, filed Jun. 17, 1992, now abandoned. This application is related to copending U.S. Patent Application entitled "Aqueous Coating Compositions For Glass Fibers, Fiber Strands Coated With Such Compositions And Optical Fiber Cable Assemblies Including Such Fiber Strands" of Mikhail M. Girgis filed concurrently with the present application.

FIELD OF THE INVENTION

This invention is directed to an optical fiber cable assembly including a reinforcing strand of glass fibers having a secondary aqueous coating and/or impregnating composition applied thereto which inhibits water wicking along the strand surface, as well as methods of reducing water wicking in an optical fiber cable assembly.

BACKGROUND OF THE INVENTION

Typically, the surfaces of glass fiber substrates are coated with a sizing composition during the forming process to protect the glass fibers from interfilament abrasion. Such sizing compositions can include as components filmformers, lubricants, coupling agents, emulsifiers, antioxidants, ultraviolet light stabilizers, colorants, antistatic agents and water, to name a few.

U.S. Pat. No. 3,853,605 discloses a combined aqueous sizing and coating composition for coating glass fibers shortly after attenuation that includes a resorcinol-formaldehyde resin solution, a styrene-butadiene-vinylpyridine terpolymer latex, an amino functional silane coupling agent, ammonia and an ammonia soluble carboxyl-containing polymer, such as an acrylic interpolymer which can include vinyl aromatic hydrocarbons such as styrene. Similarly, U.S. Pat. No. 4,060,658 discloses an impregnant for glass fibers comprising a resorcinol-formaldehyde resin, a terpolymer latex of butadiene-styrene and vinylpyridine, a butadiene latex, a portion of which can be replaced by a styrene-butadiene copolymer latex, and a wax. U.S. Pat. Nos. 4,164,485 and 4,239,800 disclose an impragnant comprising neoprene latex, styrene-butadiene-vinylpyridine terpolynier latex, resorcinol formaldehyde resin, resorcinol, formaldehyde, wax and natural rubber. The aforementioned coated strands are disclosed for use as reinforcement for elastomeric products such as natural or synthetic rubber. The use of resorcinol-formaldehyde latex coatings, however, gives rise to a number of environmental and health concerns which limits their use.

U.S. Pat. No. 4,663,231 discloses an impregnant for glass fibers for woven fabric comprising an elastomeric, ethylene-containing interpolymer, a crosslinkable material, and a diene-containing elastomer U.S. Pat. No. 5,182,784 discloses an aqueous coating composition for glass fibers consisting essentially of a thermoplastic polyurethane latex, an acrylic latex, and either a second acrylic latex or paraffin wax. This coating reduces water wicking by glass fibers in applications such as optical fiber cable reinforcement.

In optical fiber cable reinforcement applications, water entering the cable assembly can corrode and/or crush the optical fibers by expansion due to freezing temperatures. It is desirable to provide an optical fiber cable assembly in which the reinforcing glass fibers are coated with a simple, economical secondary coating which can withstand the rigorous environment to which such reinforcement is subjected, as well as provide water wicking resistance characteristics to the reinforcement.

SUMMARY OF THE INVENTION

The present invention provides an optical fiber cable assembly comprising an optical fiber and a reinforcement strand positioned about at least a portion of a periphery of the optical fiber for reinforcing the optical fiber cable, the reinforcement strand comprising a plurality of sized glass fibers having on a surface thereof a dried residue of a secondary aqueous coating composition, the secondary aqueous coating composition comprising: (a) a first polymer prepared by vinyl addition polymerization of a first monomer component comprising a first vinyl aromatic monomer and an acrylic monomer; and (b) a second polymer different from the first polymer, the second polymer being prepared by vinyl addition polymerization of a second monomer component comprising a curable polymer of a second vinyl aromatic monomer, the secondary aqueous coating composition being essentially free of a urethane-containing material, wherein the surface of the strand having thereon the dried residue of the secondary aqueous coating composition wicks water at a rate of less than about 25.4 millimeters (one inch) in about six hours at a temperature of about 25° C.

In another aspect of the present invention, the aqueous coating composition consists essentially of the first polymer and the second polymer described above, wherein the surface of the strand having thereon the dried residue of the secondary aqueous coating composition wicks water at a rate of less than about 25.4 millimeters (one inch) in about six hours at a temperature of about 25° C.

The present invention also includes a method of reducing the wicking of water along the surface of a glass fiber strand comprising a plurality of glass fibers, comprising: (a) applying an aqueous sizing composition to surfaces of the plurality of glass fibers; (b) at least partially drying the sized plurality of glass fibers of (a); (c) gathering the plurality of glass fibers to form a strand; (d) applying to the strand a secondary coating composition comprising: (1) a first polymer prepared by vinyl addition polymerization of a first monomer component comprising a first vinyl aromatic monomer and an acrylic monomer; and (2) a second polymer different from the first polymer, the second polymer being prepared by vinyl addition polymerization of a second monomer component comprising a curable polymer of a second vinyl aromatic monomer, the secondary aqueous coating composition being essentially free of a urethane-containing material; and (e) at least partially drying the secondarily coated strand of sized glass fibers of (d), such that the surface of the strand having thereon the dried residue of the secondary aqueous coating composition wicks water at a rate of less than about 25.4 millimeters (one inch) in about six hours at a temperature of about 25° C.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

Figure 1:
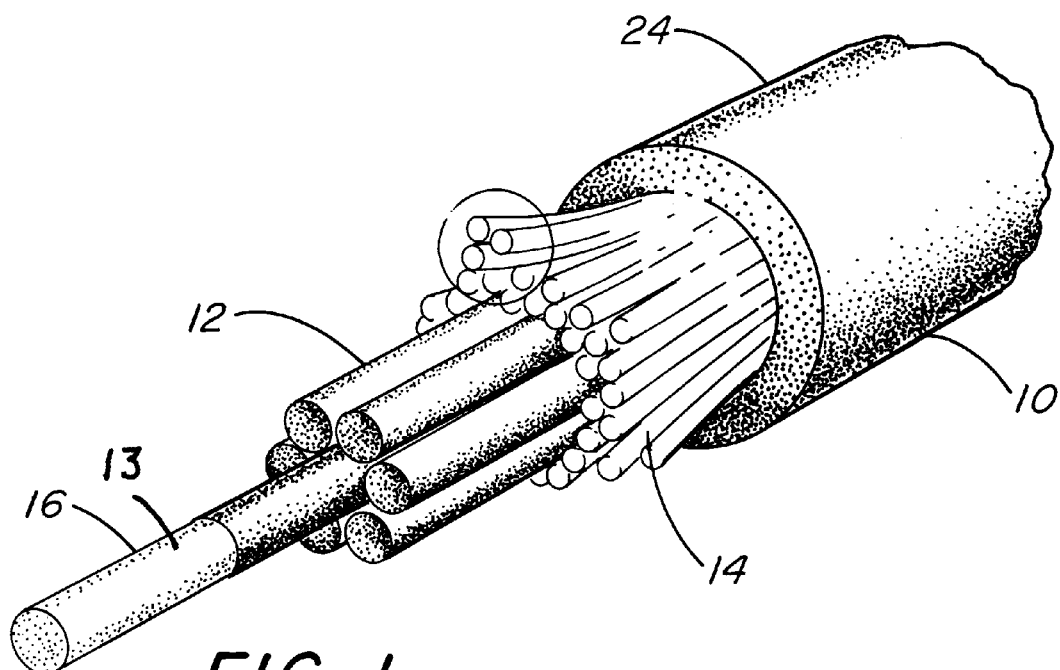
FIG. 1 is a perspective view of a portion of an optical fiber cable assembly according to the present invention.
Figure 2:
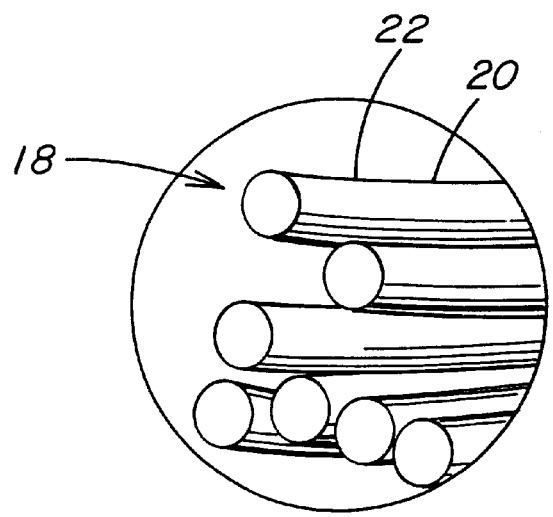
FIG. 2 is an enlarged view of a portion of FIG. 1.

The present invention includes an optical fiber cable assembly 10, such as is shown in FIG. 1, comprising: (a) one or more optical fibers 12; and (b) a reinforcement strand 14 positioned about at least a portion of a periphery 13 of the optical fiber 12 for reinforcing the optical fiber cable assembly 10.

Useful optical fibers are formed from extremely pure silica glass. Suitable optical fibers are well known to those of ordinary skill in the art and are commercially available from AT&T or Corning Glass Works of Corning, New York. Such fibers typically have diameters of about 125 microns and lengths of about 2 kilometers to about 20 kilometers.

In typical optical fiber cables 10, the optical fibers 12 are positioned about a generally stiff member 16, which can be an epoxy/glass pultruded rod or steel rod, for example. The member 16 provides stability to the cable to inhibit contraction and expansion of the assembly 10 due to environmental temperature change.

The reinforcement strand 14, which inhibits tension and compressive forces on the optical fibers 12, comprises a plurality of sized glass fibers 18 having on a surface 20 thereof a dried residue of a secondary aqueous coating composition 22. As used herein, the terms "size", "sized" or "sizing" refer to the aqueous composition applied to the fibers immediately after formation of the glass fibers, prior to application of the secondary aqueous coating composition. The term "secondary coating" refers to a coating composition applied secondarily to one or a plurality of strand(s) after the sizing composition is applied, and preferably at least partially dried.

Such sizing compositions can include as components film-formers such as thermoplastic or thermosetting polymeric film-formers in a variety of forms including emulsions, dispersions, latexes thereof and mixtures thereof, such as liquid polyoxyalkylene polyols or polyalkylene polyols (polypropylene/polyethylene copolymers); lubricants such as animal, vegetable or mineral oils or waxes or cationic lubricants such alkyl imidazoline derivatives and polyethyleneimine polyamides; coupling agents, including silane coupling agents such as gamma-aminopropyltrimethoxysilane, gamma-methacryloxypropyltrimethoxysilane and gamma-glycidoxypropyltrimethoxysilane; emulsifiers; antioxidants; antifoaming agents; colorants; antistatic agents; bactericides and water, to name a few, though preferably starch is not included.

Examples of suitable sizing compositions are set forth in K. Loewenstein, *The Manufacturing Technology of Continuous Glass Fibres* at pages 243–295 (2d Ed. 1983) and U.S. Pat. Nos. 4,390,647 and 4,795,678, each of which is hereby incorporated by reference.

It has been observed that the presence of a silicone emulsion in the sizing composition, such as LE-9300 silicone emulsion which is commercially available from OSi Specialties, Inc. of Danbury, Conn., facilitates wicking of water along the sized and secondarily coated strand. Therefore, it is preferred that the sizing composition be essentially free of such a silicone emulsion. The phrase "essentially free of a silicone emulsion" as used herein means that the sizing composition includes less than about 10 weight percent of such a silicone emulsion, and preferably less than about 1 weight percent on an aqueous basis.

The secondary aqueous coating composition includes a first polymer prepared by vinyl addition polymerization of a first monomer component comprising a first vinyl aromatic monomer(s) and an acrylic monomer(s).

The first polymer can be water soluble, emulsifiable or dispersible. As used herein, the term "water soluble" means that the polymer is capable of being essentially uniformly blended and/or molecularly or ionically dispersed in water to form a true solution. See *Hawley's Condensed Chemical Dictionary*, (12th Ed. 1993) at page 1075, which is hereby incorporated by reference.

The term "emulsifiable" as used herein means that the polymer is capable of forming an essentially stable mixture or being suspended in water in the presence of an emulsifying agent. See *Hawley's* at page 461, which is hereby incorporated by reference. Non-limiting examples of suitable emulsifying agents are set forth below.

The term "dispersible" means that the polymer is capable of being distributed throughout water as finely divided particles, such as a latex. See *Hawley's* at page 435, which is hereby incorporated by reference. The uniformity of the dispersion can be increased by the addition of wetting, dispersing or emulsifying agents (surfactants), which are discussed below.

As used herein, the term "curable" means (1) the first polymer and/or second polymer are capable of being at least partially dried by air and/or heat; and/or (2) the first polymer and/or second polymer, other components of the composition and/or glass fibers are capable of being crosslinked to each other to change the physical properties of the first polymer and/or second polymer. See *Hawley's* at page 331, which is hereby incorporated by reference.

Non-limiting examples of suitable first vinyl aromatic monomers include vinylbenzene, divinylbenzene, vinyl toluene, alpha methyl styrene, halostyrenes such as chlorostyrene, and mixtures thereof.

The first acrylic monomer(s) (hereinafter "acrylic(s')") can include acrylic acid, methacrylic acid, derivatives and mixtures thereof. See *Kirk-Othmer Encyclopedia of Chemical Technology*, Vol. 1 (1963) at page 285, which is hereby incorporated by reference. Other non-limiting examples of suitable acrylics include esters of acrylic acid and methacrylic acid, such as acrylates and methacrylates, including epoxy functional (meth)acrylates, acrylic anhydrides, acrylamides, acrylonitriles and derivatives and mixtures thereof. Useful acrylics can have hydroxy and/or epoxy functionality.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably containing about 1 to about 18 carbon atoms. Non-limiting examples of alkyl esters include methyl (meth)acrylate, ethyl (meth) acrylates, propyl (meth)acrylates, butyl (meth)acrylates, pentyl (meth)acrylates, hexyl (meth)acrylates, heptyl (meth) acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth) acrylates and 2-ethyihexyl (meth)acrylate. Suitable hydroxyalkyl esters include 2-hydroxyethyl (meth)acrylate, 2-hydroxypropyl (meth)acrylate, 3-hydroxypropyl (meth) acrylate and hydroxybutyl (meth)acrylate.

Non-limiting examples of other useful acrylics include glycol acrylates such as ethylene glycol diacrylate, propylene glycol diacrylate, 1,3-propanediol acrylate, 1,4-butanediol acrylate, 1,4-butanediol methacrylate, 1,6-hexanediol diacrylate, neopentyl glycol diacrylate, 1,3-butyleneglycol diacrylate and tetraethylene glycol diacrylate. A useful polyol acrylate is trimethylolpropane triacrylate.

Useful epoxy functional acrylates include polyglycidyl acrylates and polyglycidyl methacrylates.

Non-limiting examples of suitable acrylamides include methacrylamide, methylolacrylamide, and N-substituted derivatives thereof.

Non-limiting examples of suitable acrylonitriles include acrylonitrile and methacrylonitrile.

Useful acrylic latexes can be characterized by the temperature at which the torsional modulus of an air dried film is 300 kg/cm$^2$, referred to as T300, which is a relative measure of stiffness. A T300 ot about +22° C. is considered soft while higher numbers indicate more stiff and/or tacky acrylics. The acrylics which can be used in the practice of this invention preferably have a T300 of about –50° C. to about +40° C, preferably about –35° C. to about +35° C.

The first vinyl aromatic monomer and/or first acrylic monomer can also be addition polymerized with other addition polymerizable monomers or polymers, as discussed below.

Non-limiting examples of addition polymerizable monomers which can be reacted with the first vinyl aromatic monomer and/or first acrylic monomer include other vinyl monomers such as dienes including butadienes such as 1,3-butadiene and 2,3-dimethyl1,3-butadiene; isoprene; and chloroprene; vinyl halides such as vinyl chloride and vinylidene chloride, vinyl acetates, block and graft copolymers thereof. Other useful addition polymerizable monomers include amides, such as n-methylol (meth)acrylamide; nitrites; pyrrolidones and olefins such as ethylene. Mixtures of any of the above addition polymerizable monomers are also useful. Preformed polymers of these monomers can also be addition polymerized with the first vinyl aromatic monomer and/or first acrylic monomer provided the preformed polymer has addition polymerizable unsaturation.

Methods for polymerizing acrylics with themselves, and/or other addition polymerizable monomers and preformed polymers are well known to those skilled in the art of polymers and further discussion thereof is not believed to be necessary in view of the present disclosure. For example, polymerization of the acrylic can be carried out in bulk, in aqueous or organic solvent solution such as benzene or n-hexane, in emulsion, or in aqueous dispersion. *Kirk-Othmer*, Vol.1 at page 305. The polymerization can be effected by means of a suitable initiator system, including free radical initiators such as benzoyl peroxide or azobisisobutyronitnile, anionic initiation, and organometallic initiation. Molecular weight can be controlled by choice of solvent or polymerization medium, concentration of initiator or monomer, temperature, and the use of chain transfer agents. If additional information is needed, such polymerization methods are disclosed in *Kirk-Othmer,* Vol.1 at pages 203–205, 259–297 and 305–307, which are hereby incorporated by reference.

The number average molecular weight (Mn) of the first polymer, determined by gel permeation chromatography (GPC), can be about 5000 to about 200,000 and is preferably about 10,000 to about 100,000. The glass transition temperature of the first polymer can be about –40° C. to about 100° C, preferably about –30° C. to about 80° C., and more preferably about –25 to about +35 as measured using a Differential Scanning Calorimeter (DSC), for example a Perkin Elmer Series 7 Differential Scanning Calorimeter, using a temperature range of about –55° C. to about 150° C. and a scanning rate of about 20° C. per minute.

Preferably, the first polymer is present in an emulsion including an emulsifying agent, suitable examples of which are discussed below. The first polymer is preferably self-crosslinking, although external crosslinking agents can be included in the secondary aqueous coating composition for crosslinking the first polymer with itself, the second polymer or other components of the secondary aqueous coating composition, as discussed below. The first polymer can be cationic, anionic or nonionic, but preferably is anionic or nonionic.

Non-limiting examples of commercially available polymers which are believed to be addition polymerization products of a vinyl aromatic monomer and an acrylic monomer include the following FULATEX® materials which are commercially available from H. B. Fuller Co. of St. Paul, Minn., including FULATEX® PN-3716K, which has a glass transition temperature of about 26° C, about 44 to about 46 weight percent solids, a pH of about 2.0 to about 3.5, a viscosity of about 10 to about 200 centipoise (measured using Brookfield Viscometer Model RVF at 20 revolutions per minute (rpm) at 25° C.). See PN-3716-K Technical Data Sheet of H.B. Fuller Co. (Jul. 25, 1994), which is hereby incorporated by reference. Other useful FULATEX® materials include FULATEX® PN-3716G styrene-acrylic copolymer, which is believed to include about 42 weight percent butyl acrylate and about 58 weight percent styrene, and FULATEX® PN-3716L1 styrene-acrylic copolymer which is believed to include about 45 weight percent butyl acrylate, 53 weight percent styrene and less than about 1 weight percent butyl methyl acrylate. FULATEX® PN-3716L1 has a glass transition temperature of about +15° C., about 44 to about 46 weigh-t percent solids, a pH of about 7.0 to about 8.5, a viscosity of about 50 to about 800 centipoise (measured using Brookfield Viscometer Model RVF at 20 revolutions per minute (rpm) at 25° C). See PN-3716-Ll Technical Data Sheet of H.B. Fuller Co. (Jul. 25, 1994).

Self-crosslinking styrene-acrylic copolymer emulsions believed to be useful in the present invention include RHOPLEX® GL-618, which is an anionic emulsion having a glass transition temperature of about +36° C., about 47 percent solids, a density of about 8.9 lb./gallon and a pH of about 8.6. See "Building Better Nonwovens", a Technical Bulletin of Rohm and Haas Specialty Industrial Polymers, (1994), which is hereby incorporated by reference. Other useful crosslinkable acrylic-based copolymer emulsions include RHOPLEX® NW-1845 (an anionic emulsion having a glass transition temperature of about –21OC, about 44 percent solids, a density of about 8.8 lb./gallon and a pH of about 6.7) and RHOPLEX® NW-1715 (an anionic emulsion having a glass transition temperature of about –6° C., about 44 percent solids, a density of about 8.4 lb./gallon and a pH of about 6.2).

Other examples of useful first polymers include acrylonitrile-butadiene-styrene terpolymers (ABS) and styrene-acrylonitrile copolymers (SAN).

The amount of first polymer is generally about 5 to about 99 weight percent of the secondary aqueous coating composition on a total solids basis, preferably about 50 to about 95 weight percent, and more preferably about 70 to about 90 weight percent.

The second polymer can be prepared by vinyl addition polymerization of a second monomer component comprising a polymer of a second vinyl aromatic monomer, however the second polymer must be different from the first polymer. For example, the second polymer can be polymerized from a different vinyl aromatic monomer or a different addition polymerizable monomer.

The second polymer can be a homopolymer, copolymer or multipolymer and can be an addition polymerization product of a monomer component comprising a vinyl aromatic monomer, polymer and/or derivatives thereof (hereinafter "vinyl aromatic(s)"). The vinyl aromatic of the second polymer can be addition polymerized with another addition polymerizable monomer or polymer, as discussed below.

Non-limiting examples of suitable vinyl aromatic monomers include vinylbenzene, divinylbenzene, vinyl toluene, alpha methyl styrene, halostyrenes such as chlorostyrene, and mixtures thereof.

Non-limiting examples of addition polymerizable monomers or polymers include ethylenically unsaturated monomers including vinyl monomers and polymers such as are discussed above, and also include acrylics such as are discussed above.

Methods for polymerizing vinyl aromatic monomers with themselves and/or other addition polymerizable monomers and preformed polymers are well known to those skilled in the art of polymers and further discussion thereof is not believed to be necessary in view of the present disclosure. For example, such polymerization methods are disclosed in the Encyclopedia of Polymer Science and Technology, Vol. 13 (1970) at pages 130–134; 156–197 and *Kirk-Othmer*, Vol. 19 at pages 90–95, all of which are hereby incorporated by reference.

Preferably, the second polymer is present in an emulsion including an emulsifying agent, suitable examples of which are discussed below. The second polymer is preferably self-crosslinking, although external crosslinking agents can be included in the secondary aqueous coating composition for crosslinking the second polymer with itself, the first polymer or other components of the secondary aqueous coating composition, as discussed below. The second polymer can be cationic, anionic or ionionic, but preferably is anionic.

Non-limiting examples of commercially available polymers which can be used as the second polymer include the ROVENE® family of self-crosslinking and crosslinkable styrene-butadiene emulsions which are commercially available from Rohm and Haas Company of Philadelphia, Pa. For example, ROVENE® 5550 is a useful self-crosslinking anionic carboxylated styrene butadiene emulsion having about 45 weight percent styrene and 55 percent butadiene, 50 percent solids, a pH of about 8.7, a Brookfield viscosity of about 300 centipoise, a glass transition temperature of about −21° C. (measured by Differential Scanning Calorimeter) and a density of about 8.4 lb./gallon at 25° C. "ROVENE® 5550", a Technical Bulletin of Rohm and Haas Company Specialty Polymers (Feb. 1994) and "Building Better Nonwovens", page 7, a Technical Bulletin of Rohm and Haas Company Specialty Polymers (1994), each of which are hereby incorporated by reference. Another self-crosslinking styrene butadiene emulsion believed to be useful in the present invention is ROVENE® 4170, which is also anionic, has about 65 percent styrene and 35 percent butadiene, 50 percent solids, a pH of about 9, a glass transition temperature of about +3° C. and a density of about 8.3 lb./gallon at 25° C. "Building Better Nonwovens" at page 7.

Non-limiting examples of crosslinkable styrene butadiene emulsions believed to be useful in the present invention include ROVENE® 4402 and ROVENE® 4106. ROVENE® 4402 is anionic, has about 50 percent styrene and 50 percent butadiene, 53 percent solids, a pH of about 8.7, a glass transition temperature of about −16° C. and a density of about 8.4 lb./gallon at 25° C. "Building Better Nonwovens" at page 7. ROVENE® 4106 is anionic, has about 90 percent styrene and 10 percent butadiene, 50 percent solids, a pH of about 8.7, a glass transition temperature of about +79° C. and a density of about 8.4 lb./gallon at 25° C. "Building Better Nonwovens" at page 7.

Thermoplastic elastomeric materials useful as second polymers in the present invention also include styrene-acrylonitrile (SAN) copolymers such as LUSTRAN, which is commercially available from Monsanto of St. Louis, Missouri, styrene-butadiene-styrene (SBS) copolymers and acrylonitrile-butadiene-styrene (ABS) copolymers, such as CYCOLAC or BLENDEX, which are commercially available from GE Plastics of Pittsfield, Mass. It should be understood, however, that although these materials can be used in the present invention, they can reduce flexibility of the secondary coating. Therefore, the selection of such materials depends upon the desired properties of the secondary coating for the intended application.

Preferably, the secondary aqueous coating composition includes RHOPLEX® NW-1715 as the first polymer and ROVENE® 5550, FULATEX® PN-3716-LI or FULATEX® PN-3716-G as the second polymer.

The amount of second polymer is typically greater than 0.5 and preferably about 1 to about 20 weight percent of the secondary aqueous coating composition on a total solids basis, and more preferably about 5 to about 15 weight percent.

The secondary aqueous coating composition is essentially free of a urethane-containing polymer, which can increase the cost of the coated strand. The phrase "essentially free of a urethane-containing polymer" as used herein means that the secondary aqueous coating composition contains less than two weight percent of a urethane-containing polymer on a total solids basis, preferably less than about one weight percent, and most preferably the secondary coating composition is free of a urethane-containing polymer.

The phrase "urethane-containing polymer" as used herein means any polymer containing one or more units of the structure (I):

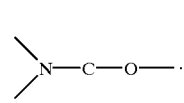

See *Kirk-Othmer*, Vol. 21 at pages 56–69, which are hereby incorporated by reference. As noted in *Kirk-Othmer*, Vol. 21 at page 57, the terms urethane and polyurethane are commonly used to refer to urethane and polyurethan, respectively. As used herein, the terms "urethane" and "polyurethane" are used to refer to "urethane" and "polyurethan", respectively. Such urethane-containing materials can be elastomeric, thermoplastic or thermosetting, and either water soluble, or emulsifiable or dispersible with the use of an emulsifying or dispersing agent.

Urethane-containing polymers are typically condensation products of a polyisocyanate material and a hydroxyl-containing material such as polyether polyol or polyester polyol and include, for example, WITCOBOND® W-290H thermoplastic polyurethane which is commercially available from Witco Chemical Corp. of Chicago, Ill. Other examples of commercially available polyurethanes include other members of the WITCOBOND® family of polyurethanes such as WITCOBONDO ® W-212 and W-234. The WITCOBONDO® W-212 material has a milky-white appearance with a 30 percent solids level and a density of 8.7 lb./gallon. The flash point is greater than 100° C., the particle charge is cationic and the particle size is about 1 micron. The pH at 25° C. (77° F) is 4.5, the viscosity at 25° C. in Brookfield LVF is 50 centipoise, and the surface tension is dynes/cm is 41. WITCOBONDS® W-234 aliphatic polyurethane is hazy in appearance, has 30 percent solids and a density of 8.8 lb./gal. The flash point is similar to the W-212 material and the particle charge is anionic. The pH at 25° C. is 8.0, the viscosity at 25° C. as measured by Brookfield LVF is 100 centipoise, and the surface tension in dynes/cm is 54.

Other examples of thermosetting polyurethanes include BAYBOND XW-110, which is commercially available from Bayer and other thermosetting polyurethanes which are commercially available from Bayer and E.l. duPont de Nemours Co. of Wilmington, Delaware. Other polyurethanes include thermoplastic urethane elastomers, such as RUCOTHANEO® 2011 L polyurethane latex, which have a solids content of 55 to 65 weight percent and are commercially available from Ruco Polymer Corp. of Hicksville, N.Y. Their pH is generally around 10 with average particle sizes ranging from about 0.8 to about 2.5 microns.

Further examples of polyurethane include those that are internally emulsified, examples of which may be found in U.S. Pat. Nos. 4,143,091; 4,208,494 and 4,208,495, each of which is hereby incorporated by reference. Other types of polyurethane polymers are those having ionic groups present on the polymer molecule such as those disclosed in U.S. Pat. No. 4,066,591.

Other examples of polyurethane polymers include polyurethane ionomers having ionic groups such as anionomers and cationomers. Examples of such ionomers include anionomers that are produced by reacting organic diisocyanates having molecular weights of from about 160 to about 300 with alkylene polyols such as ethylene glycol, and optionally other aliphatic glycols having molecular weights of from about 62 to about 200 in the presence of glycols containing carboxyl, carboxylate, sulfonic acid and/or sulfonate groups and having a number average molecular weight of less than around 500. These polyurethane polymers containing the ionic groups of hydrophilic polyether segments are self-emulsifiable. Other polyurethanes include cationic polyurethanes that are formed by quaternizing polyaddition reactions. Such polyurethanes are not only self-dispersing but typically have average particle sizes of less than about 5 microns.

The secondary aqueous coating composition can include a crosslinking agent for crosslinking the first polymer and the second polymer. Non-limiting examples of suitable crosslinkers which can be used when the first polymer or second polymer is thermosetting are amimoplast and phenoplast resins which are well known to those skilled in the polymer art. For example, the CYMEL® family of melamine resins from American Cyanamid Company are useful crosslinking agents.

Other useful crosslinking agents include blocked isocyanates such as BAYBOND XW 116 or XP 7055, epoxy crosslinkers such as WITCOBOND XW by Witco Corp., and polyesters such as BAYBOND XP-7044 or 7056. The BAYBOND products are commercially available from Bayer of Pittsburgh, Pa. Generally, the amount of crosslinker can be about 1 to about 10 weight percent of the secondary aqueous coating composition on a total solids basis, preferably about 4 to about 6 weight percent, and more preferably about 5 to about 6 weight percent.

The aqueous secondary coating composition can include a fiber lubricant. Useful lubricants include cationic, nonionic or anionic lubricants and mixtures thereof. Generally, the amount of lubricant can be about 1 to about 15 weight percent of the secondary aqueous coating composition on a total solids basis, preferably about 3 to about 12 weight percent, and more preferably about 5 to about 10 weight percent.

Non-limiting examples of such lubricants are glass fiber lubricants which include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY®-6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and Protolube HD high density polyethylene emulsion which is commercially available from Sybron Chemicals of Birmingham, N.J.

The secondary aqueous coating composition can include emulsifying agents for emulsifying the first polymer and/or second polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is the material PLURONIC™ F-108, which is commercially available from BASF Corporation of Parsippany, N.J. This material is a condensate of ethylene oxide with hydrophobic bases formed by condensation of propylene oxide with propylene glycol.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanol is IGEPAL CA-630 from GAF Corporation of Wayne, N.J.

An example of a polyoxyethylated vegetable oil is EMULPHOR EL-719, which is commercially available from GAF Corp. A useful polyoxyethylene octylphenyl glycol ether is TRITON X-100, which is commercially available from Rohm & Haas of Philadelphia, Pa. TWEEN 21 and 81 are examples of useful ethylene oxide derivatives of sorbitol esters.

Generally, the amount of emulsifying agent can be about 0.5 to about 10 weight percent of the secondary aqueous coating composition on a total solids basis, and is preferably about 0.5 to about 5 weight percent.

The secondary aqueous coating composition can include one or more aqueous soluble, emulsifiable or dispersible wax materials. The wax material can be selected from vegetable, animal, mineral, synthetic or petroleum waxes, for example. Preferably, the wax has a high degree of crystallinity and is obtained from a paraffinic source, such as a microcrystalline wax. The microcrystalline wax can be oxidized. Suitable commercially available waxes are, for example, MICHEM® LUBE 296 microcrystalline wNax, POLYMEKON® SPP-W microcrystalline wax and PETROLITE 37 and PETROLITE 75 microcrystalline waxes. These waxes, which are paraffinic hydrocarbon dispersions, are available from Michelman Inc. of Cincinnati, Ohio and the Petrolite Corporation of Tulsa, Okla., respectively. Generally, the amount of wax can be about 1 to about 10 weight percent of the secondary aqueous coating composition on a total solids basis, and preferably about 3 to about 5 weight percent. On an aqueous basis, the amount of wax material generally can be about 0.25 to about 5 weight percent and, more preferably, about 0.5 to about 4.3 weight percent.

Flame retardant, such as antimony trioxides and halogenated phosphates, and antistatic agent can also be included in the secondary aqueous coating composition. The amount of flame retardant or antistatic agent can be about 1 to about 3 weight percent of the secondary aqueous coating composition on a total solids basis.

A dye can be included in the secondary aqueous coating composition to provide a colored strand product. Non-limiting examples of useful colorants or pigments include carbon black, nigrosine, and cadmium-based compounds, iron oxide-based compounds and chromium compounds. Other useful colorants or pigments include AQUA BLACK which is commercially available from B.F. Goodrich and ULTRAMARINE BLUE which is commercially available from Whittaker Chemical. Generally, the amount of dye on an aqueous basis can be about 1 to about 5 weight percent, and more preferably about 1 to about 3 weight percent. Users of the treated strand may find dyed strand useful for various applications where color coding is important.

The secondary aqueous coating composition can also include one or more aqueous dispersible or soluble plasticizers. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer generally can be about 5 to about 15 weight percent of the secondary aqueous coating composition on a total solids basis, and is more preferably about 5 to about 10 weight percent.

Water (preferably deionized) is included in the secondary aqueous coating composition in an amount sufficient to facilitate application of a generally uniform coating upon the strand. Generally, the weight percentage of solids of the secondary aqueous coating composition can be about 10 to about 50 weight percent. Preferably, the weight percentage of solids is about 20 to about 35 weight percent and, more preferably, about 25 to about 35 weight percent. Although not preferred, it should be understood that minor amounts of water miscible or water soluble organic solvents can be included in the secondary aqueous coating composition, so long as the essential characteristics of the coating composition are not adversely affected.

The secondary aqueous coating composition of the present invention can be prepared by any suitable method well known to those of skilled in the art. Preferably, the first polymer is formed by addition polymerization of the monomer component. Similarly, the second polymer is formed by addition polymerization of the monomer component. Each of the first polymer and the second polymer is preferably diluted with deionized water before mixing with the other components.

The first and second polymers can be mixed and/or reacted with any other components of the secondary aqueous coating composition, such as emulsifiers, dye, wax and/or water. Preferably each of the components is diluted with water prior to addition to the mixture. If necessary, the plasticizer or lubricant can be pre-emulsified prior to addition to the mixture. The components of the composition are then mixed to form a generally homogenous mixture prior to application to the strand. While the composition is being applied to the strand, it is preferred that the composition be agitated for 1 minute out of every 10 minutes of recirculating when being recirculated through a holding tank.

Before application of the secondary coating composition, the glass fibers are treated with a sizing composition, such as are discussed above, or fiber protectant to reduce interfilament abrasion. The secondary aqueous coating composition of the present invention can be applied to any type of fiberizable glass composition known to those skilled in the art. Glass fibers suitable for use in the present invention include those prepared from fiberizable glass compositions such as "E-glass", "621-glass", "A-glass", "C-glass", "D-glass", "S-glass", "ECR-glass" (corrosion resistant glass) and fluorine and/or boron-free derivatives thereof. Such compositions are well known to those skilled in the art and are disclosed in Loewenstein at pages 29 and 33–45, which is hereby incorporated by reference.

The secondary coating composition of the present invention is applicable to high modulus, low elongation (a modulus of elongation of at least $7 \times 10^6$ psi and an elongation at break of at most 5 percent) fibers or filaments, preferably sized glass fibers.

The sizing can be applied in many ways; such as by contacting the strand with a roller or belt applicator, spraying, or other means. Non-limiting examples of such applicators and other suitable applicators are disclosed in *Loewenstein* at pages 169–177, which is hereby incorporated by reference.

The sized fibers can be dried at room temperature or at elevated temperatures. Suitable ovens for drying glass fibers are well known to those of ordinary skill in the art. Drying of glass fiber forming packages or cakes is discussed in detail in *Loewenstein* at pages 224–230, which is hereby incorporated by reference. For example, the forming package can be dried in an oven at a temperature of about 104° C. (220° F.) to about 149° C. (300° F.) for about 10 to about 13 hours to produce glass fiber strands having a dried residue of the curable composition thereon. The temperature and time for drying the glass fibers will depend upon such variables as the percentage of solids in the sizing composition, components of the sizing composition and type of glass fiber. The sizing is present on the fibers in an amount between about 0.5 percent and 5 percent by weight after drying. After drying, the sized glass fibers are typically gathered together into bundles or strands of generally parallel fibers and further treated with the secondary aqueous coating composition of the present invention.

The secondary aqueous coating composition of the present invention is applied to at least a portion of the surface of the strand in an amount effective to coat or impregnate the portion of the strand. The secondary aqueous coating composition can be applied by dipping the strand in a bath containing the composition, by spraying the composition upon the strand or by contacting the strand with an applicator such as a roller or belt applicator, for example. The coated strand can be passed through a die to remove excess coating composition from the strand. The method and apparatus for applying the secondary aqueous coating composition to the strand is determined in part by the configuration of the strand material.

Preferably, the process of applying the secondary aqueous coating composition includes passing the strands through a bath or dip of the secondary aqueous coating composition and preferably includes exposing the fibers to elevated temperatures for a time sufficient to at least partially dry or cure the secondary aqueous coating composition. The strand can be "opened up" just before entering the secondary treating composition bath by passing it over a bar or other spreading device which acts to separate the individual fibers from one another. This spreading of the fibers from one another results in a more thorough impregnation of the strand with the composition.

The amount of the secondary aqueous coating composition on the strand is defined as the dip pick-up (DPU). The DPU is calculated using the weight of the glass strand before and after the secondary aqueous coating composition is applied. The DPU is defined as the coated strand weight minus the uncoated strand weight, then divided by the uncoated strand weight. Multiplying the resultant figure by 100 results in percent DPU. The DPU of the impregnated bundles or strands of the instant invention is about 5 to about 20 weight percent for a single pass through the impregnant bath and drying step. The strands may ultimately have an amount of coating greater than about 30 weight percent by passing them through the impregnating bath a number of times or by overcoating the coated bundle of fibers or strands with the secondary coating composition. Preferably, the strand having dried residuedried residue of the secondary aqueous coating composition thereon typically has a dip pick-up (DPU) of between about 5 to about 30 weight percent, and preferably about 8 to about 15 weight percent.

The strand is preferably dried after application of the secondary aqueous coating composition in a manner well known in the art. The impregnated strand is at least partially dried in air at room temperature (about 25° C.) or alternatively in a furnace or oven preferably above 232° C.(450° F.) to speed the curing process and evaporate the water. A particularly suitable drier is that disclosed in U.S. Pat. No. 5,197,202, which is hereby incorporated by reference.

After the sizing and secondary coating composition have been applied to the glass strand and each layer has been dried, additional coatings, such as a tertiary coating composition, can be applied to at least a portion of the strand. In one embodiment, the tertiary coating composition includes one or more acrylic polymer(s) such as are discussed above, which is different from one of the acrylic polymers of the secondary coating composition. Preferably, the tertiary coating composition includes an ethylene acrylic acid copolymer, such as MICHEM® PRIME 4983HS aqueous ethylene acrylic acid copolymer emulsion. MICHEM® PRIME 4983HS has about 35 weight percent solids.

Preferably the acrylic polymer comprises about 0.5 to about 5 weight percent of the tertiary coating composition, and more preferably about 1 weight percent. The tertiary coating composition can also include an antistatic agent such as is discussed above.

The tertiary coating composition generally includes about 10 to about 40 weight percent solids, and preferably about 20 to about 30 weight percent. The tertiary coating composition can be applied in a manner similar to that of the secondary coating composition discussed above.

The tertiary coating composition can be dried in air, a furnace or oven, as discussed above, although it is preferred to dry the coating in air. The strand having the dried residue of the tertiary coating composition thereon can have a dip pick-up (DPU) of between about 5 to about 30 weight percent, and preferably about 8 to about 15 weight percent.

The coated strand is incorporated as reinforcement in an optical fiber cable assembly (shown in FIG. 1). The optical fiber assembly 10 can also include a protective layer 24 positioned about at least a portion of a periphery of the optical fiber 12 and reinforcement strand 14. Typically, the protective layer 24 comprises a thermoplastic material extruded as a jacket over the other components of the assembly 10. Suitable thermoplastic materials include polyethylene and polyvinyl chloride. The protective layer 24 protects the assembly 10 from damage from the environment.

When this protective layer 24 is breached, or at spolices or joints in the optical fiber cable assembly, water can enter the interior of the assembly, possibly causing corrosion of the optical fibers. Also, freezing temperatures can cause the water to freeze and expand, thereby crushing the optical fibers. It is important that the reinforcement strand of glass fibers simply and economically inhibit wicking or capillary movement of water through or along the strand and inhibit contact of water with the optical fibers.

The water wicking of a coated strand can be determined by a water wicking test, such as the BellCore water wicking test No. TR-NWT-00492 (a test method of AT&T) or "Test Procedures for Wicking and Hygroscopicity", a technical bulletin of Superior Cable Corporation, which is hereby incorporated by reference.

The water wicking of a coated strand can also be determined by the following method, which will generally be referred to herein as the "Water Wicking Estimation Method". An aqueous solution including a dye indicator is placed in a suitable container, such as a conventional beaker which is commercially available from Fisher Scientific, and a sample of a reinforcing strand is inserted into the solution such that about 2.54 centimeters (1 inch) of the strand is below the surface of the solution and about 15.24 centimeters (6 inches) is above the surface.

The surface area of the solution should be large enough such that the sides of the container do not unduly influence the wicking of the strand. Preferably, the dye is Imperon Blue Dye which is commercially available from Hoechst Celanese of Charlotte, N.C. Other useful dyes include inks and any number of conventional dyes known to those skilled in the art. The wicking of the strand can be measured by measuring the distance which the dye wicks along the strand above the surface of the solution. The wicking test should be conducted at about 25° C. (77° F.) for at least about 6 hours.

Under such test conditions, the coated strand of the present invention wicks water at a rate of less than about 25.4 millimeters (one inch) in about six hours at a temperature of about 25° C. and preferably less than about 12.7 millimeters (0.5 inches).

The present invention also provides a method of reducing the wicking of water along the surface of a glass fiber strand comprising a plurality of glass fibers. The method comprises a first step of applying an aqueous sizing composition to surfaces of the plurality of glass fibers, which is discussed above. The sized glass fibers are at least partially dried, preferably in an oven at temperatures and for a period of time as discussed above. The plurality of dried glass fibers is then gathered to form a strand. The aforementioned secondary coating composition is applied to the strand, as discussed above. The secondarily coated strand is at least partially dried, such that the surface of the strand having thereon the dried residue of the secondary aqueous coating composition wicks water at a rate of less than about 25.4 millimeters (one inch) in about six hours at a temperature of about 25° C., as discussed above.

The present invention will now be illustrated by the following specific, non-limiting examples.

EXAMPLE 1

Ten gallon mixtures of the aqueous sizing compositions of Tables 1 and 2 were prepared, applied to 2 strand bundles of H-15 E-glass fibers (1600 filaments per strand) and wound onto individual forming packages in a manner similar to those discussed above. The weight of sizing composition on the fibers after drying the forming package at a temperature of about 100° C. for about 10 hours was about 0.7 weight percent.

TABLE 1

| Component for Sample No. 1 | Weight Percent of Component |
|---|---|
| PLURACOL V-10 polyoxyalkylene polyol[1] | 78 |
| EMERY 6717 partially amidated polyethylene imine lubricant[2] | 8 |
| A-1108 aminosilane[3] | 14 |

[1]PLURACOL V-10 polyoxyalkylene polyol is commercially available from BASF Wyandotte of Michigan.
[2]EMERY 6717 partially amidated polyethylene imine lubricant is commercially available from Henkel Corporation of Kankakee, Illinois.
[3]A-1108 aminosilane is commercially available from OSi Specialties, Inc. of Danbury, Connecticut.

TABLE 2

| | Weight of Component (grams) for Sample No. | | |
|---|---|---|---|
| Component | 2 | 3 | 4 |
| PLURACOL V-10 polyoxyalkylene polyol[4] | 300 | 300 | 1500 |
| FULATEX ® PN-3716L1[5] | 2400 | — | — |
| FULATEX ® PN-3716G[6] | — | 2500 | — |
| LE-9300 silicone emulsion[7] | — | — | 700 |
| EMERY 6717 partially amidated polyethylene imine lubricant[8] | — | — | — |
| EMERY 6760 lubricant[9] | 412 | 412 | 412 |
| AIRVOL 205[10] polyvinyl acetate | 700 | — | — |
| A-1108 aminosilane[11] | 150 | 150 | 150 |
| A-174 silane[12] | 150 | 150 | 150 |
| acetic acid | 15 | 15 | 15 |

[4]PLURACOL V-10 polyoxyalkylene polyol.
[5]FULATEX ® PN-3716L1 acrylic multipolymer having about 44 to about 46 weight percent solids weight percent solids is commercially available from H. B. Fuller Co. of St. Paul, Minnesota. FULATEX ® PN-3716L1 is believed to include about 45 weight percent butyl acrylate, 53 weight percent styrene and less than about 1 weight percent butyl methyl acrylate.
[6]FULATEX ® PN-3716G acrylic multipolymer is commercially available from H. B. Fuller Co. of St. Paul, Minnesota. FULATEX ® PN-3716G acrylic multipolymer is believed to include about 42 weight percent butyl acrylate and about 58 weight percent styrene.

TABLE 2-continued

| | Weight of Component (grams) for Sample No. | | |
|---|---|---|---|
| Component | 2 | 3 | 4 |

[7]LE-9300 silicone emulsion has about 50 weight percent solids and is commercially available from OSi Specialties, Inc. of Danbury, Connecticut.
[8]EMERY 6717 partially amidated polyethylene imine lubricant is commercially available from Henkel Corporation of Kankakee, Illinois.
[9]EMERY 6760 lubricant is commercially available from Henkel Corporation.
[10]AIRVOL 205 polyvinyl acetate is commercially available from Air Products and Chemicals of Trexlertown, Pennsylvania.
[11]A-1108 gamma-aminopropyltrimethoxysilane is commercially available from OSi Specialties, Inc. of Danbury, Connecticut.
[12]A-174 silane is commercially available from OSi Specialities, Inc. of Danbury, Connecticut.

The sized glass fiber strands were coated with various secondary coating compositions, the formulations of which are set forth in Table 3 below.

TABLE 3

| | Weight of Component (grams) for Sample | | | |
|---|---|---|---|---|
| Component | A | B | C | D |
| RHOPLEX ® NW-1715[13] acrylic polymer | 1000 | 1000 | 1000 | 1000 |
| ROVENE ® 5550[14] styrene-butadiene copolymer | 100 | — | — | — |
| FULATEX ® PN-3716G[15] styrene-acrylic copolymer | — | — | 100 | — |
| FULATEX ® PN-3716J[16] styrene-acrylic copolymer | — | — | — | 100 |
| FULATEX ® PN-3716L1[17] styrene-acrylic copolymer | — | 100 | — | — |
| PETROLITE 75 microcrystalline wax[18] | 100 | 50 | 50 | 50 |
| Deionized water | 850 | 850 | 850 | 850 |

[13]RHOPLEX NW-1715 anionic acrylic polymer emulsion having a glass transition temperature of about −6° C., about 44 percent solids, a density of about 8.4 lb./gallon and a pH of about 6.2 is commercially available from Rohm and Haas Company of Philadelphia, Pennsylvania.
[14]ROVENE ® 5550 is a self-crosslinking anionic carboxylated styrene butadiene copolymer emulsion having about 45 weight percent styrene and 55 percent butadiene which is commercially available from Rohm and Haas Company.
[15]FULATEX ® PN-3716G is commercially available from H. B. Fuller Co. of St. Paul, Minnesota.
[16]FULATEX ® PN-3716J acrylic multipolymer having about 44 to about 46 weight percent solids is commercially available from H. B. Fuller Co.
[17]FULATEX ® PN-3716L1 acrylic multipolymer is commercially available from H. B. Fuller Co.
[18]PETROLITE 75 microcrystalline wax dispersion is commercially available from the Petrolite Corporation of Tulsa, Oklahoma.

The secondary aqueous coating compositions were applied to the sized glass fibers by drawing the glass fibers through a bath of the coating and a die to remove excess coating, such that the loss on ignition (LOI) of the coated glass strand was about 8 to about 12 percent. The diameter of the passage through the die for the 4 strand samples prepared was about 1.1 millimeters (0.044 inches).

A. Wicking Evaluation

Each coated strand was evaluated for wicking of water along the strand using the Water Wicking Estimation Method discussed above. A conventional 500 milliliter plastic beaker was filled with about 250 milliliters of a 1 weight percent aqueous solution of Imperon Blue Dye, which is available from Hoechst Celanese. An approximately six inch long sample of each strand was individually inserted into the solution to a depth of about 25.4 millimeters (1 inch). The sample was supported by a thin sheet of plastic about 1 inch wide and about 6 inches in length positioned approximately in the center of the beaker. Each sample was kept in the solution for at least 6 hours at a temperature of about 25° C. (77° F.). A sample of a glass fiber strand believed to be commercially available from Owens Corning Fiberglas (OCF) was also tested in this manner. It is believed that the coating on this strand included ethyl acrylate, ethylene methyl acrylate, styrene, and less than about 0.1 weight percent of alpha-methyl styrene.

To pass this test, the strand must wick less than about 25.4 millimeters (one inch) in about six hours at a temperature of about 25° C. The results of this test for each sample are set forth below in Table 4.

TABLE 4

| Sizing Composition | Secondary Coating | | | | OCF Sample |
|---|---|---|---|---|---|
| | A | B | C | D | |
| 1 | PASS | PASS | PASS | PASS | FAIL |
| 2 | PASS | PASS | PASS | PASS | |
| 3 | PASS | PASS | PASS | PASS | |
| 4 | FAIL | FAIL | FAIL | FAIL | |

As shown in Table 4, the secondary coating compositions of the present invention provide acceptable wicking resistance when evaluated using the Water Wicking Estimation Method, except for the Samples which included Sizing Composition No. 4.

It appears that LE-9300 silicone emulsion, which was included in Sizing Composition No. 4, facilitates wicking. Therefore, as discussed above, it is preferred that the sizing composition applied to the glass fibers prior to secondary coating be essentially free of such a silicone emulsion.

B. Other Physical Properties Five specimens each of strand coated with the aqueous secondary coating compositions of Table 3 were conditioned at about 24° C. ±2° C. (75° F. ±5° F.) at about 55% ±5% relative humidity for at least two hours and evaluated for tensile breaking strength (pounds-force or $lb_f$) using a drum clamp test fixture on an Instron Model No.1125 testing machine. The chart speed was 25.4 millimeters/minute (1 inch/minute), the crosshead speed was 304.8 millimeters/minute (12 inches/minute) and the load was 453.6 kilograms (1000 lbs.).

The relative resistance to bending was evaluated for five test specimens each of strand coated with the aqueous secondary coating compositions of Table 3 using a MIT Folding Endurance Tester Model #2, which is commercially available from Tinius Olsen Testing Machine Co. of Willow Grove, Pennsylvania. Each test specimen was 15.24 centimeters (6 inches) in length. Each specimen was conditioned at about 23° C. ±2° C. (73.4° F. ±3.6° F. ) for at least 2 hours prior to testing. A 1.52 mm (0.06 inch) jaw, 2 lb. load and spring No. 4 were used to evaluate the number of cycles to failure. See also ASTM Standard D-2176.

Two five yard skein specimens of strands coated with the aqueous secondary coating compositions of Table 3 were evaluated for percentage of outgassing at 250° C. and loss on ignition (LOI), which is the weight loss of coating on the glass strand after heating at about 650° C. (about 1200° F.).

Two five yard skein specimens of strand coated with the aqueous secondary coating compositions of Table 3 were evaluated for loss on ignition (LOI), which is the weight loss of coating on the glass strand after heating at about 650° C. (about 1200° F.).

Each specimen was weighed at a temperature of about 23° C. ±2° C. (73.4° F. ±3.6° F.) at a relative humidity of about 55% ±5%. The specimens were heated in a conventional muffle furnace to a temperature of about 650° C. (about 1200° F.) for about 30 minutes, cooled to room temperature and reweighed.

The results of the evaluations for average tensile breaking strength, outgassing at 250° C., average cycles to failure (MIT folding test) and loss on ignition (LOI) for strands coated with the aqueous secondary coating compositions of Samples A–D of Table 3 are set forth in Table 4.

Table 5 shows that samples including the secondary coating composition of the present invention have good tensile strength and flexibility.

TABLE 5

| TEST | Sizing Composition and Secondary Coating Composition | | | | | | | | | | |
|---|---|---|---|---|---|---|---|---|---|---|---|
| | 1A | 2A | 3A | 1B | 2B | 3B | 1C | 2C | 3C | 1D | 2D |
| Average Tensile Strength ($lb_f$) | 102 | 135 | 118 | 98 | 139 | 123 | 111 | 135 | 110 | 99 | 136 |
| Average Percent Outgassing at 250° C. | 1.24 | 0.91 | 1.14 | 2.30 | 1.37 | 1.5 | 2.05 | 1.38 | 1.85 | 1.8 | 1.34 |
| Average MIT Folding Flexibility (cycles to failure) | 1500 | — | 6000 | 6800 | — | 2100 | 12000 | 1500 | 3500 | 13000 | — |
| Average Loss on Ignition (%) | 8.6 | 7.8 | — | 12.4 | 8.4 | — | 10.5 | 8.1 | — | 11.6 | 8.4 |

EXAMPLE 2

Several glass fiber strands were sized with the sizing compositions of Samples 1 or 2 of Example 1 and coated with secondary coatings believed to be according to the present invention in a manner similar to that disclosed in Example 1 above. The formulations for the secondary coatings are set forth in Table 6 below.

TABLE 6

| Component | Weight of Component (grams) for Sample | | | | | | | | |
|---|---|---|---|---|---|---|---|---|---|
| | E | F | G | H | I | J | K | L | M |
| RHOPLEX ® NW-1715[19] acrylic polymer | 1360 | 1360 | 500 | 1000 | 1000 | 1000 | 1000 | 1000 | 1000 |
| ROVENE ® 5550[20] styrene-butadiene copolymer | 300 | 500 | 100 | 100 | 100 | 100 | 200 | 300 | 400 |
| RHOPLEX ® E-32 acrylic polymer[21] | 440 | 220 | 500 | — | — | — | — | — | — |
| EL-9300 silicone emulsion[22] | — | — | — | — | — | 50 | — | — | — |
| PETROLITE 37 microcrystalline wax[23] | 100 | 100 | 50 | 50 | — | — | — | — | — |

[19]RHOPLEX ® NW-1715 anionic acrylic polymer emulsion is commercially available from Rohm and Haas Company.
[20]ROVENE ® 5550 self-crosslinking anionic carboxylated styrene butadiene copolymer is commercially available from Rohm and Haas Company.
[21]RHOPLEX ® E-32 acrylic polymer having about 46 weight percent solids is commercially available from Rohm and Haas Company.
[22]LE-9300 silicone emulsion has about 50 weight percent solids and is commercially available from OSi Specialties, Inc. of Danbury, Connecticut.
[23]PETROLITE 37 microcrystalline wax dispersion is commercially available from the Petrolite Corporation of Tulsa, Oklahoma.

Deionized water was added to each sample to adjust the solids to about 30 percent by weight.

Each Sample was evaluated for outgassing at 250° C. using the method set forth above in Example 1. Table 7 below provides the outgassing values at 250° C. for each Sample.

TABLE 7

| Outgassing at 250° C. | Weight of Component (grams) for Sample | | | | | | | | |
|---|---|---|---|---|---|---|---|---|---|
| | E | F | G | H | I | J | K | L | M |
| Sizing Composition 1 | — | — | 0.98 | 0.87 | 0.65 | 0.72 | 0.97 | 0.94 | 0.96 |
| Sizing Composition 2 | — | — | 0.74 | 0.74 | 0.52 | 0.51 | 0.72 | 0.72 | 0.73 |

As shown in Table 7, the outgassing values for glass fiber strands coated with secondary coating compositions of the present invention are extremely low and indicate that such coated strands can provide low gas void formation when the protective layer is extruded over the coated strands.

EXAMPLE 3

Glass fiber strand, which was sized with the sizing composition of Sample 1 and coated with the secondary coating of Sample A according to Example 1, was overcoated with about 25 weight percent solids MICHEM® PRIME 4983HS ethylene acrylic acid copolymer in deionized water to yield a dried residue upon the strand of about 1 weight percent as an overcoat. The Control was not overcoated. The loss on ignition of the strand was about 9 weight percent without the tertiary coating. The strand having the tertiary coating applied thereto had a loss on ignition of about 10 weight percent.

The average tensile breaking strength (with and without soaking in aqueous solutions of hydrochloric acid or sodium hydroxide), average tensile stiffness, average composite tensile modulus, percent outgassing, loss on ignition (LOI) and adhesion to polyvinyl chloride were evaluated for the overcoated and non-overcoated samples.

To determine the tensile stiffness and composite tensile modulus of each specimen, three 10 yard skein specimens of strands coated with the aqueous secondary coating compositions of each of the samples were conditioned under similar conditions to those set forth above for tensile breaking strength testing. Each specimen was weighed and measured for specific gravity using a Fisher-Young gravitometer Model No. 2-148. Each specimen was evaluated for tensile stiffness and composite tensile modulus using pneumatic grips on an Instron Model No. 1125 testing machine. The Instron machine was set to Range 2 (Strain Data Unit) (which provides a magnification ratio of 1000), the crosshead speed was 5.1 millimeters/minute (0.2 inches/minute) and the full scale chart load was 45.4 kilograms (kg) (100 lbs.) or 22.7 kg (50 lbs.) load on the specimen.

The average adhesion of each strand in high density polyethylene or polyvinyl chloride was determined according to ASTM D1871-68, which was modified as follows. Seven specimens of each sample were prepared, each specimen being about 30.48 centimeters (12 inches) to about 76.2 centimeters (30 inches) in length.

Fourteen specimens were prepared for testing at a time by the following method. The platens of the press were preheated to about 182° C. (360° F.). A 10.16 centimeter (4 inch) by 25.4 centimeter (10 inch) sheet of MYLAR® polyester film, which is commercially available from E.I. du Pont de Nemours et Cie & Company of Wilmington, Del., was placed in the mold cavity of the bottom plate of a heated press. The strand cavity in the bottom plate was placed on the MYLAR® film with a 1 inch insert. About 40 grams of solid thermoplastic molding stock (high density polyethylene or polyvinyl chloride) was placed generally uniformly in the mold cavity. The polyvinyl chloride (757C) and high density polyethylene are both available from AT&T.

A knot was tied in each test specimen, which was placed in the cavity with the knot positioned outside of the cavity. Strand tension weights were attached to the end of each test specimen to align each strand straight in the mold. Fourteen specimens were accommodated in the molding. An additional 40 grams of stock was placed over the strands for a total of about 80 ±0.5 grams of stock per molding. A sheet of MYLAR®. film was placed over the stock, and the top plate placed upon the mold.

The mold was placed in the press at a clamp pressure of less than about 1 ton until the platen temperature returned to about 182° C. (360° F.). When the platen temperature reached about 182° C. (360° F.), the pressure upon the mold was increased to about 10 tons for about 5 minutes. The platen heaters were turned off and cooling water turned on for about five minutes, then the molding was removed from the press.

The MYLAR® film was stripped from the samples and the strand and flashing on the knot side of the molding were cut flush with the molding edge. The flashing from the other side of the molding was also removed. Each sample was tested for the force necessary to pull the strands linearly out of the molding stock according to ASTM D-1871–68.

The results of testing conducted similarly to Example 1 above for average tensile breaking strength, average tensile stiffness, average composite tensile modulus, percent outgassing, loss on ignition (LOI) and adhesion to polyvinyl chloride are set forth in Table 8.

Also included in Table 8 are results from tensile strength testing of samples soaked in (1) 1 normal aqueous solution of hydrochloric acid at about 24° C. (75° F.) for about 3 hours; or (2) 1 molar aqueous solution of sodium hydroxide at about 24° C. (75° F.) for about two minutes. Each sample was rinsed in water for about two minutes and dried at 120° C. (250° F.) for about 5–10 minutes.

TABLE 8

| TEST | Control[24] | Overcoated Sample[25] |
|---|---|---|
| Average Tensile Strength (lb$_f$) | 221 | 223 |
| Percent COV[26] of Tensile Strength | 4.30 | 2.14 |
| Average Tensile Strength (lb$_f$) after Hydrochloric Acid Soak | 145 | 157 |
| Percent COV of Tensile Strength after Hydrochloric Acid Soak | 10.80 | 1.96 |
| Percent Retention after Hydrochloric Acid Soak | 72.5 | 78.5 |
| Average Tensile Strength (lb$_f$) after Sodium Hydroxide Soak | 217 | 203 |
| Percent COV of Tensile Strength after Sodium Hydroxide Soak | 5.68 | 4.78 |
| Percent Retention after Sodium Hydroxide Soak | 109 | 102 |
| Average Tensile Stiffness (lb$_f$/percent elongation) | 74.0 | 77.3 |
| Average Tensile Modulus (lb$_f$/inch$^2$ × 10$^6$) | 4.35 | 4.61 |
| Percent COV of Tensile Modulus | 1.3 | 1.6 |
| Average Percent Outgassing at 200° C. | 0.501 | 0.691 |
| Average Percent Outgassing at 250° C. | 1.23 | 1.27 |
| Average Loss on Ignition (%) | 10.1 | 11.1 |
| Average Adhesion to polyvinyl chloride (lb$_f$) | 6.15 | 7.44 |
| Percent COV of Adhesion to polyvinyl chloride | 19.3 | 25.2 |
| Average Adhesion to high density polyethylene (lb$_f$) | 13.4 | 22.4 |
| Percent COV of Adhesion to high density polyethylene | 27.6 | 14.9 |

[24]Four strand bundle.
[25]Four strand bundle.
[26]Coefficient of Variation.

As shown in Table 8, the ethylene-acrylic acid overcoat has greater tensile strength after soaking in hydrochloric acid and greater adhesion to high density polyethylene when compared to the Control which does not include the overcoat.

From the foregoing description, it can be seen that the present invention provides a simple, economical optical fiber cable assembly in which the reinforcement strand resists water wicking and is capable of withstanding the rigorous environment to which such reinforcement is subjected It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

What is claimed is:

1. An optical fiber cable assembly comprising:
    (a) an optical fiber; and
    (b) a reinforcement strand positioned about at least a portion of a periphery of the optical fiber for reinforcing the optical fiber cable, the reinforcement strand comprising a plurality of sized glass fibers having on a surface thereof a dried residue of a secondary aqueous coating composition, the secondary aqueous coating composition comprising:
        (a) a first polymer prepared by vinyl addition polymerization of a first monomer component comprising a first vinyl aromatic monomer and an acrylic monomer; and
        (b) a second polymer different from the first polymer, the second polymer being prepared by vinyl addition polymerization of a second monomer component comprising a curable polymer of a second vinyl aromatic monomer, the secondary aqueous coating composition being essentially free of a urethane-containing material, wherein the surface of the strand having thereon the dried residue of the secondary aqueous coating composition wicks water at a rate of less than 25.4 millimeters (one inch) in about six hours at a temperature of about 25° C.

2. The optical fiber cable assembly according to claim 1, wherein the first polymer comprises about 1 to about 99 weight percent of the secondary aqueous coating composition on a total solids basis.

3. The optical fiber cable assembly according to claim 1, wherein the second polymer comprises about 1 to about 99 weight percent of the secondary aqueous coating composition on a total solids basis.

4. The optical fiber cable assembly according to claim 1, wherein at least one of the first monomer component or the second monomer component further comprises a monomer having epoxy functionality.

5. The optical fiber cable assembly according to claim 1, wherein the first vinyl aromatic monomer is a styrenic monomer selected from the group consisting of vinylbenzene, divinylbenzene, vinyl toluene, alpha methyl styrene, halostyrenes and mixtures thereof.

6. The optical fiber cable assembly according to claim 1, wherein the acrylic monomer is selected from the group consisting of acrylic acid, methacrylic acid, alkyl esters of acrylic acid, alkyl esters of methacrylic acid, acrylic anhydrides, acrylamides, acrylonitriles and derivatives and mixtures thereof.

7. The optical fiber cable assembly according to claim 1, wherein the second vinyl aromatic monomer is a styrenic monomer selected from the group consisting of vinylbenzene, divinylbenzene, vinyl, alpha methyl styrene, halostyrenes and mixtures thereof.

8. The optical fiber cable assembly according to claim 1, wherein the second monomer component further comprises an ethylenically unsaturated monomer.

9. The optical fiber cable assembly according to claim 6, wherein the ethylenically unsaturated monomer is selected from the group consisting of vinyl aromatics, dienes, vinyl halides, vinyl acetates, amides, nitriles, pyrrolidones, unsaturated olefins and mixtures thereof.

10. The optical fiber cable assembly according to claim 1, wherein the secondary aqueous coating composition comprises less than two weight percent of a urethane-containing material.

11. The optical fiber cable assembly according to claim 1, wherein the aqueous coating composition is essentially free of a resorcinol-formaldehyde-containing material.

12. The optical fiber cable assembly according to claim 11, wherein the secondary aqueous coating composition comprises less than 3 weight percent of the resorcinol-formaldehyde-containing material on an aqueous basis.

13. The optical fiber cable assembly according to claim 1, wherein the aqueous coating composition further comprises a wax material.

14. The optical fiber cable assembly according to claim 13, wherein the wax material comprises about 1 to about 10 weight percent of the secondary aqueous coating composition on a total solids basis.

15. The optical fiber cable assembly according to claim 1, wherein the sized and coated strand has on the surface thereof a tertiary coating composition comprising an acrylic polymer different from the first polymer and second polymer of the secondary coating composition.

16. The optical fiber cable assembly according to claim 1, wherein the aqueous coating composition further comprises a dyeing agent.

17. The optical fiber cable assembly according to claim 1, further comprising a protective layer positioned about at least a portion of a periphery of the optical fiber and reinforcement strand, the protective layer comprising a thermoplastic material.

* * * * *